United States Patent
Zhang et al.

(10) Patent No.: US 11,508,349 B2
(45) Date of Patent: Nov. 22, 2022

(54) NOISE REDUCTION METHOD AND APPARATUS FOR ON-BOARD ENVIRONMENT, ELECTRONIC DEVICE AND STORAGE MEDIUM

(71) Applicant: Beijing Baidu Netcom Science and Technology Co., LTD, Beijing (CN)

(72) Inventors: Zaidong Zhang, Beijing (CN); Zhanxue Li, Beijing (CN); Tingting Che, Beijing (CN)

(73) Assignee: Beijing Baidu Netcom Science and Technology Co., LTD, Beijing (CN)

( * ) Notice: Subject to any disclaimer, the term of this patent is extended or adjusted under 35 U.S.C. 154(b) by 0 days.

(21) Appl. No.: 17/206,766

(22) Filed: Mar. 19, 2021

(65) Prior Publication Data
US 2021/0210063 A1    Jul. 8, 2021

(30) Foreign Application Priority Data
Apr. 16, 2020  (CN) .......................... 202010301016.1

(51) Int. Cl.
*G10K 11/178* (2006.01)
*G10L 21/0208* (2013.01)

(52) U.S. Cl.
CPC ........ *G10K 11/178* (2013.01); *G10L 21/0208* (2013.01); *G10K 2210/1282* (2013.01)

(58) Field of Classification Search
CPC .......... G10K 11/178; G10K 11/17883; G10K 11/17885; G10K 2210/1282; G10K 2210/12821; G10L 21/0208
(Continued)

(56) References Cited

U.S. PATENT DOCUMENTS

| 2003/0040908 A1* | 2/2003 | Yang ................. H04R 3/005 704/233 |
| 2012/0087513 A1* | 4/2012 | Takatani ............ H04R 1/406 381/92 |

(Continued)

FOREIGN PATENT DOCUMENTS

| CN | 104243732 A | 12/2014 |
| CN | 207274272 U | 4/2018 |

(Continued)

OTHER PUBLICATIONS

Aug. 12, 2021—(EP) Extended European Search Report—App. No. 21164070.1.
(Continued)

*Primary Examiner* — Daniel R Sellers
(74) *Attorney, Agent, or Firm* — Banner & Witcoff, Ltd.

(57) ABSTRACT

A noise reduction method and apparatus for an on-board environment, an electronic device and a storage medium are provided, which are applicable to a field of computer technology, and particularly to a field of audio processing. The noise reduction method for an on-board environment includes: receiving an interference signal in the on-board environment and receiving a sound signal in the on-board environment, the interference signal comprising a vibration signal of a vehicle; and performing noise reduction processing on the sound signal in the on-board environment to obtain a noise-reduced signal; wherein, the noise reduction processing comprises cancelling the interference signal from the sound signal in the on-board environment.

12 Claims, 4 Drawing Sheets

(58) Field of Classification Search
USPC .................................. 381/71.4, 73.1, 86, 94.7
See application file for complete search history.

(56) References Cited

U.S. PATENT DOCUMENTS

| | | | |
|---|---|---|---|
| 2017/0032806 A1* | 2/2017 | Konjeti | G10K 11/17854 |
| 2018/0077507 A1 | 3/2018 | Bernal Castillo et al. | |
| 2020/0175956 A1* | 6/2020 | Bastyr | G10K 11/17823 |
| 2021/0225353 A1* | 7/2021 | Wang | G10K 11/17854 |

FOREIGN PATENT DOCUMENTS

| | | |
|---|---|---|
| EP | 1879180 A1 | 1/2008 |
| JP | H0695695 A | 4/1994 |
| JP | 2008070877 A | 3/2008 |
| JP | 2016025514 A | 2/2016 |
| WO | 0014731 A1 | 3/2000 |

OTHER PUBLICATIONS

Feb. 8, 2022—(JP) Office Action and Search Report—App, No. 2021-048152.

* cited by examiner

FIG. 1

S110 — Receiving an interference signal in the on-board environment and receiving a sound signal in the on-board environment, the interference signal comprising a vibration signal of a vehicle S120 — Performing noise reduction processing on the sound signal in the on-board environment to obtain a noise-reduced signal; wherein, the noise reduction processing comprises cancelling the interference signal from the sound signal in the on-board environment

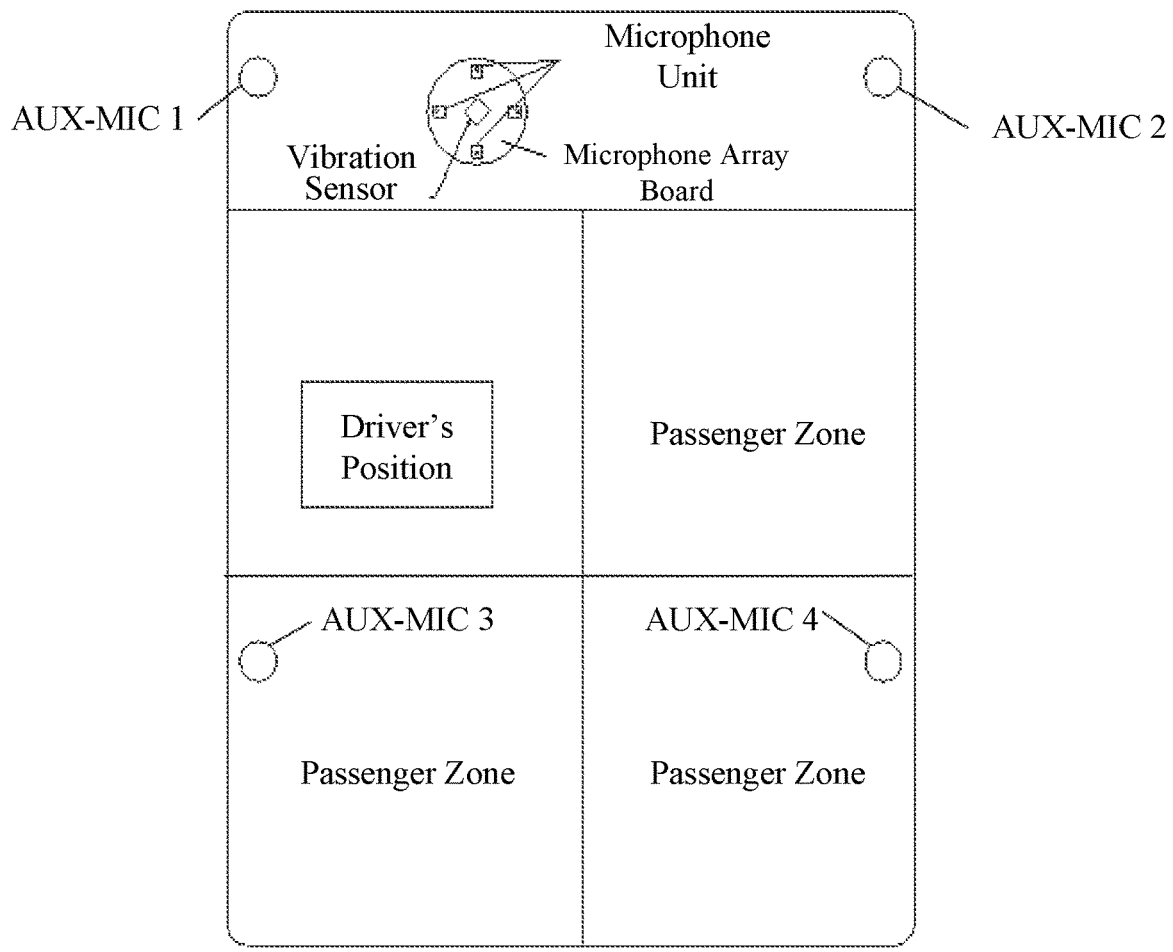

FIG. 2

NOISE REDUCTION METHOD AND APPARATUS FOR ON-BOARD ENVIRONMENT, ELECTRONIC DEVICE AND STORAGE MEDIUM

CROSS-REFERENCE TO RELATED APPLICATION

This application claims priority to Chinese patent application No. 202010301016.1, filed on Apr. 16, 2020, which is hereby incorporated by reference in its entirety.

TECHNICAL FIELD

The present application is applicable to a field of computer technology, and particularly to a field of audio processing.

BACKGROUND

The application of on-board speech recognition and speech interaction in real life is becoming more and more common. In a process of a speech recognition, it is necessary to cancel sound signals generated by a sounding unit of an on-board device and environmental noise, and remain effective speech command signals.

SUMMARY

The embodiments of the present application propose a noise reduction method and apparatus for an on-board environment, an electronic device and a storage medium, so as to solve least one of the above problems in the prior art.

In a first aspect, an embodiment of the present application provides a noise reduction method for the on-board environment, comprising:

receiving an interference signal in the on-board environment and receiving a sound signal in the on-board environment, the interference signal comprising a vibration signal of a vehicle; and performing noise reduction processing on the sound signal in the on-board environment to obtain a noise-reduced signal; wherein, the noise reduction processing comprises cancelling the interference signal from the sound signal in the on-board environment.

In a second aspect, an embodiment of the present application provides a noise reduction apparatus for an on-board environment, comprising:

a reception unit configured to receive an interference signal in the on-board environment and receive a sound signal in the on-board environment, the interference signal comprising a vibration signal of a vehicle; and a processing unit configured to perform noise reduction processing on the sound signal in the on-board environment to obtain a noise-reduced signal; wherein, the noise reduction processing comprises cancelling the interference signal from the sound signal in the on-board environment.

In a third aspect, an embodiment of the present application provides an electronic device, comprising:

at least one processor; and
a memory in communication connection with the at least one processor; wherein, the memory has instructions executable by the at least one processor stored therein, the instructions, when executed by the at least one processor, enable the at least one processor to perform the method provided by any embodiment of the present application.

In a fourth aspect, an embodiment of the present application provides a non-transitory computer-readable storage medium having computer instructions stored therein, wherein the computer instructions, when executed by a computer, cause the computer to perform the method provided by any embodiment of the present application.

Other effects of the optional ways of the present application will be explained later in conjunction with specific embodiments.

BRIEF DESCRIPTION OF THE DRAWINGS

The accompanying drawings are provided for better understanding of the present application, rather than limiting it. In the drawings, FIG. 1 is a flowchart of a noise reduction method for an on-board environment according to an embodiment of the present application;

FIG. 2 is a schematic diagram of an interior of a cab to which a noise reduction method for an on-board environment according to an embodiment of the present application applies;

DETAILED DESCRIPTION OF THE EMBODIMENTS

Figure 3:
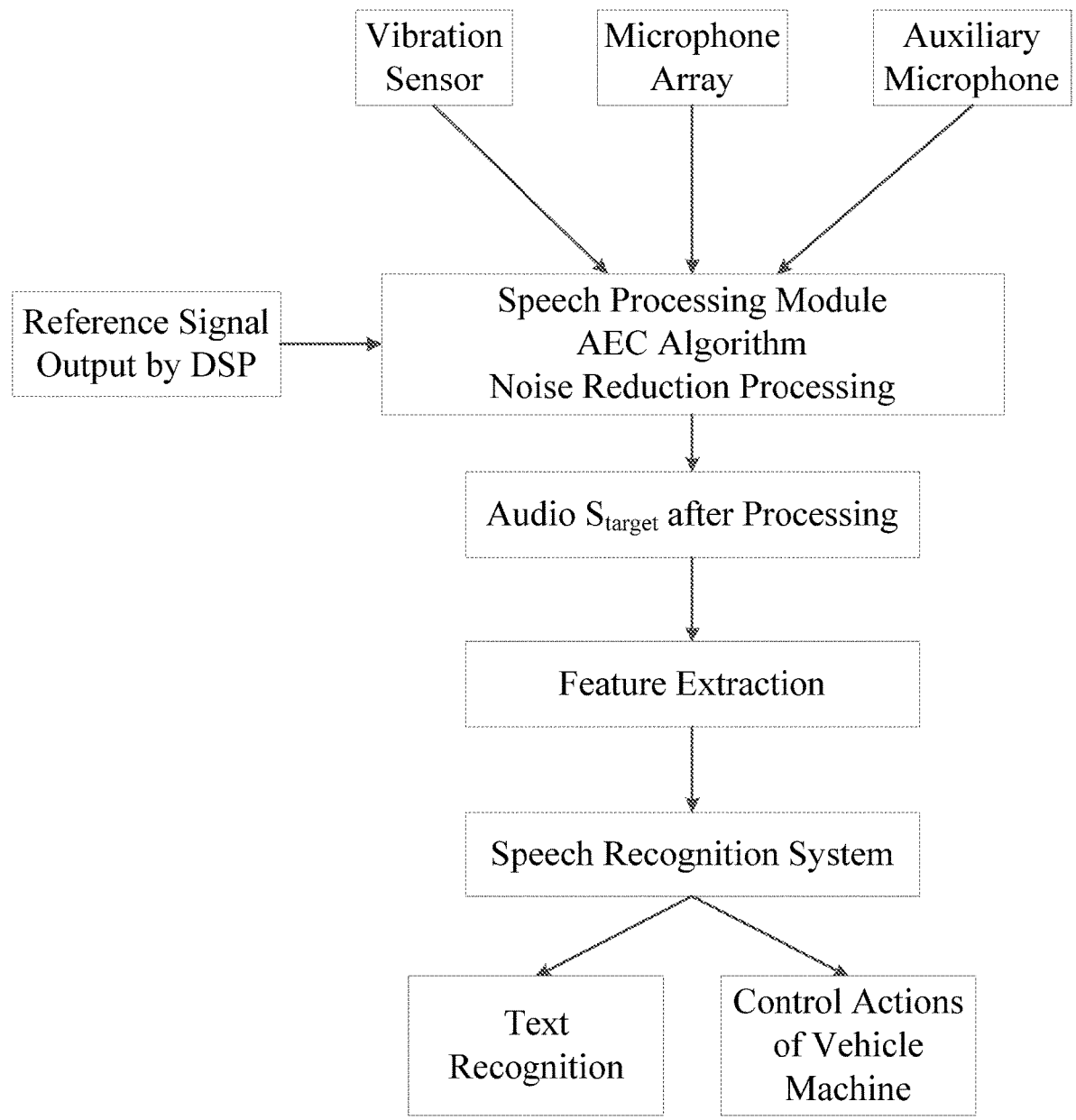
FIG. 3 is a processing flowchart by a speech recognition system for a noise reduction method for an on-board environment according to another embodiment of the present application.

The exemplary embodiments of the application will be described below in combination with drawings, including various details of the embodiments of the application to facilitate understanding, which should be considered as exemplary only. Therefore, those of ordinary skill in the art should realize that various changes and modifications can be made to the embodiments described herein without departing from the scope and spirit of the present application. Likewise, descriptions of well-known functions and structures are omitted in the following description for clarity and conciseness.

FIG. 1 is a flowchart of a noise reduction method for an on-board environment according to an embodiment of the present application. Referring to FIG. 1, the noise reduction method for the on-board environment comprises:

Step S110: receiving an interference signal in the on-board environment and receiving a sound signal in the on-board environment, the interference signal comprising a vibration signal of a vehicle; and Step S120: performing noise reduction processing on the sound signal in the on-board environment to obtain a noise-reduced signal; wherein, the noise reduction processing comprises cancelling the interference signal from the sound signal in the on-board environment.

The Acoustic Echo Cancellation (AEC) technology means adopting an echo cancellation method, i.e., estimating the magnitude of an echo signal by an adaptive method, and then subtracting the estimated value from the received signal to cancel the echo. For example, an interference signal may be collected by a sound signal collection device, and then the noise reduction processing is performed on the received sound signal to cancel the interference signal from the received sound signal. The noise reduction processing comprises subtracting the interference signal from the received sound signal to achieve the purpose of canceling the interference signal.

In the prior art, the acoustic echo cancellation processing is to pick up a sound signal by a microphone, and then perform acoustic echo cancellation processing on the sound signal. During the processing, some interference signals related to a speech frequency band (e.g., low-frequency signals caused by a vibration of the vehicle or other interference signals related to the speech frequency band) are not collected, which leads to a poor signal to noise ratio of the pickup microphone over the whole frequency band, thereby deteriorating a speech recognition effect in the on-board environment.

For example, when the vehicle has a large vibration amplitude, the signal to noise ratio (SNR) of the pickup microphone is very poor over the whole frequency band. In terms of the spectrum, the low-frequency component of the microphone is high. In some on-board environments with much low-frequency vibration noise, such as large trucks, agricultural motor vehicles, etc., the speech recognition effect will become very poor.

In view of this, in the noise reduction method for the on-board environment proposed in the present application, firstly, an interference signal comprising a vibration signal of a vehicle is collected for AEC algorithm processing, which can effectively improve the noise reduction capability of the acoustic echo cancellation. In step S110, a vibration sensor may be adopted to collect the vibration signals of the vehicle, and an acoustic sensor (e.g., a microphone) may be adopted to receive all sound signal in the on-board environment.

In step S120, the noise reduction processing is performed on the sound signal in the on-board environment collected in step S110. Here, the noise reduction processing may comprise: performing a subtractive operation on the sound signal and the interference signal in the on-board environment to cancel the interference signal. A vibration sensor may detect the vibration signal in the environment and convert the vibration intensity into an AC voltage signal. The working principle of the microphone is to sense the vibration intensity of the vibrating diaphragm of the microphone and convert such vibration intensity of the vibrating diaphragm into an AC voltage signal. In an embodiment of the present application, a subtractive operation is performed on the sound signal in the on-board environment collected by the microphone and the interference signal collected by the vibration sensor to cancel the interference signal. For example, the interference signal may be inverted in its value and the inverted interference signal is linearly superimposed on the sound signal in the on-board environment, so as to cancel the interference signal. During the noise reduction processing, calculations may be performed on a sound signal and an interference signal in the on-board environment collected at the same moment to obtain the Fast Fourier Transform (FFT) spectrum of the aforementioned two signals. In the FFT spectrum, the moduli of corresponding frequency points are subtracted from each other. The noise-reduced signal is obtained by cancelling the interference signal through the subtraction operation.

According to an embodiment of the present application, the vibration signal of the vehicle may be canceled from the sound signal in the on-board environment, so as to improve the noise reduction capability of the acoustic echo cancellation in a speech recognition system, and increase the SNR of effective signal, thereby effectively improving the speech recognition and wake-up capability of the system.

In one implementation, the receiving the sound signal in the on-board environment comprises: receiving the sound signal in the on-board environment collected by an acoustic sensor unit provided on an acoustic sensor array.

The acoustic sensor array consists of a certain number of acoustic sensor (e.g., microphone) units and is configured to sample and process the spatial characteristics of a sound field. For example, a microphone array consists of a certain number of microphone units. In an embodiment of the present application, the microphone units on the microphone array may be adopted to collect the sound signal in the on-board environment. FIG. 2 is a schematic diagram of an interior of a cab to which a noise reduction method for an on-board environment according to an embodiment of the present application applies. A vehicle machine system is provided in a cab located in the front of a vehicle. As shown in FIG. 2, a microphone array board may be provided in the vehicle machine system. A circular microphone array is taken as an example in FIG. 2. Microphone units on the microphone array board are adopted to collect the sound signal in the on-board environment.

Through the microphone array technology, since various microphone units are arranged at different positions in the microphone array, the acoustic waves received by respective microphones have different phases. The acoustic waves may be filtered by using the differences between the phases of the acoustic waves received by the microphone units, so that the environmental background sound may be preliminarily cancelled. In an embodiment of the present application, through collecting the sound signal in the on-board environment by the microphone units on the microphone array, a relatively clear sound signal may be collected and then subjected to the noise reduction processing, so that the noise reduction effect is better; on this basis, the speech recognition and wake-up capability of the system may be ensured.

In one implementation, the receiving the interference signal in the on-board environment comprises: receiving the vibration signal of the vehicle collected by a vibration sensor provided on an acoustic sensor array.

Referring to FIG. 2, the vibration sensor may be provided on the microphone array board to collect the vibration signal of the vehicle by using the vibration sensor. Since the vibration generated by the vehicle during travelling causes the vehicle machine system and the microphone units on the microphone array to vibrate along with the vehicle, the sound signal in the on-board environment collected by the microphone units would include the vibration signal of the vehicle. The vibration signal of the vehicle is a kind of interference signal.

In an embodiment of the present application, the vibration sensor is provided on the microphone array, which ensures that the vibration sensor can collect the vibration signals of the microphone units. In the subsequent steps, the noise reduction processing is performed with the vibration signal, improving the noise reduction capability of the acoustic echo cancellation in the speech recognition system.

In one implementation, the vibration sensor is provided at a central position of the acoustic sensor array.

Referring to FIG. 2, the vibration sensor is placed at a central position of the microphone array board. The microphone units and the vibration sensor are attached onto the same Printed Circuit Board (PCB).

In an embodiment of the present application, the vibration sensor is placed at a geometric central position of the microphone array board, which reduces the difference caused by the different positions of the vibration sensor relative to respective microphone units, and ensures that the vibration sensor can collect the vibration signals of the microphone units more accurately.

In one implementation, the interference signal further comprises a sound signal played by an on-board device.

In one example, a driver's speech needs to be recognized during the vehicle travelling. If the on-board device is playing a sound signal at this time, such as playing a song, a voice broadcast, etc., the sound signal played by the on-board device and the sound signal generated by the driver's speech would be picked up by the microphone array simultaneously. In this case, the sound signal played by the on-board device is an interference signal.

A sound signal played by the on-board device may be acquired from the on-board device playing the sound signal, and then a subtraction operation is performed on the sound signal in the on-board environment and the sound signal played by the on-board device during the noise reduction processing, so as to cancel the sound signal played by the on-board device.

In an embodiment of the present application, the sound signal played by the on-board device, as one of the interference signals, is canceled from the sound signal in the on-board environment, which further improves the noise reduction capability of the acoustic echo cancellation in the speech recognition system.

In one implementation, the interference signal further comprises an environmental noise signal;

the receiving the interference signal in the on-board environment comprises receiving the environmental noise signal collected by an acoustic sensor provided in the on-board environment.

In one example, in the case of performing a speech recognition on a speech signal in a driver's sound region, the environmental noise signal may comprise the sound generated by opening and closing a window, the sound outside the window, the speech signal outside the driver's sound region, etc. The environmental noise signal is another kind of interference signal.

Referring to FIG. 2, acoustic sensors may be provided at various positions in the on-board environment to collect the environmental noise signal. For example, auxiliary microphones (AUX-MIC) are provided at four corners of the interior of the cab to collect environmental noise signals. AUX-MIC 1, AUX-MIC 2, AUX-MIC 3, and AUX-MIC 4 as shown in FIG. 2 represent those auxiliary microphones provided in respective articulation regions in the on-board environment, respectively.

In an embodiment of the present application, the environmental noise signal, as one of the interference signals, is canceled from the sound signal in the on-board environment, which further improves the noise reduction capability of the acoustic echo cancellation in the speech recognition system.

In one implementation, the above method further comprises:

extracting a speech feature sequence from the noise-reduced signal;

performing a speech recognition on the sound signal in the on-board environment based on the speech feature sequence.

After completing the noise reduction processing on the sound signal in the on-board environment, the speech recognition may be performed based on the noise-reduced signal. An exemplary speech recognition system may comprise the following parts:

1. Speech feature extraction: a speech feature sequence that varies with time is extracted from the speech signal. For example, in an embodiment of the present application, the speech feature sequence is extracted from the noise-reduced signal.

2. Acoustic model and pattern matching (recognition algorithm): an acoustic model is usually generated by training with the acquired speech feature sequence, for the purpose of building an articulation template for each articulation. During a speech recognition, an unknown speech feature is matched and compared with an acoustic model to obtain an optimum recognition result. In an embodiment of the present application, a speech recognition is performed on the sound signal in the on-board environment based on the speech feature sequence.

3. Semantic understanding: a computer analyzes the recognition result grammatically and semantically, and understands the meaning of a speech to respond accordingly. The semantic understanding is usually realized by a linguistic model.

In an embodiment of the present application, since the interference signal in the sound signal in the on-board environment is effectively canceled in the preceding steps, the noise reduction capability of the acoustic echo cancellation in the speech recognition system is improved; on this basis, the speech recognition and wake-up capability of the system are also effectively improved.

In one implementation, the above method further comprises:

extracting a speech feature sequence from the noise-reduced signal;

acquiring an operation instruction corresponding to the speech feature sequence; and executing the operation instruction.

In one example, the driver's speech needs to be recognized during the vehicle travelling. For example, when the driver says "turn on the air conditioner," the sound signal in the on-board environment collected by the microphone array includes the driver's speech signal and the interference signal. Noise reduction processing is performed on the sound signal in the on-board environment to obtain a noise-reduced signal. After completing the noise reduction processing, a corresponding operation instruction, i.e., turning on the air conditioner, may be executed based on the noise-reduced signal.

In one implementation, the speech feature sequence may be extracted from the noise-reduced signal, then the speech recognition may be performed on the sound signal in the on-board environment based on the speech feature sequence, and the corresponding operation instruction may be executed according to a result of the speech recognition.

In another implementation, the speech recognition may not be performed, instead, the speech feature sequences corresponding to the speech signals of various operation instructions may be stored in advance. In a case that the speech feature sequence extracted from the noise-reduced signal is matched with a pre-stored speech feature sequence, a corresponding operation instruction is obtained according to the matching result, and then the operation instruction is executed.

In an embodiment of the present application, since the interference signal in the sound signal in the on-board environment is effectively canceled in the preceding steps, the noise reduction capability of the acoustic echo cancellation in the speech recognition system is improved; on this basis, the effect of using the speech control function is also effectively improved.

FIG. 3 is a processing flowchart by a speech recognition system for a noise reduction method for an on-board environment according to another embodiment of the present application. As shown in FIG. 3, a speech processing module may be provided in a vehicle machine system. The speech processing module adopts an AEC algorithm to perform noise reduction processing on the sound signal in the on-board environment.

Here, the microphone units on the microphone array are adopted to collect all the sound signals they can picked up at their respective positions, i.e., the sound signal in the on-board environment which is denoted as S1.

The sound signal played by the on-board device itself is an interference signal. The sound signal played by the on-board device itself may be acquired from a reference signal output by a Digital Signal Processing (DSP) processor of the vehicle machine system, and is denoted as S2.

The vibration sensor collects the vibration signal arriving at the microphone array board. The vibration signal is also a kind of interference signal, and is denoted as S3.

The auxiliary microphones provided at four corners of the interior of the cab are configured to collect the environmental noise signal. The environmental noise signal is also a kind of interference signal, and is denoted as S4.

The above collected signals are subjected to AEC algorithm processing to obtain a noise-reduced signal:

$$S_{target}=S1-S2-S3-S4;$$

wherein $S_{target}$ is the noise-reduced signal after the processing.

Based on the noise-reduced signal $S_{target}$ after the processing, a speech feature sequence is obtained by a feature extraction model. The speech feature sequence is uploaded to a speech recognition system in the cloud. The corresponding recognition text may be output after decoding and error correction, and the vehicle machine system may be controlled to perform an operation related to a speech instruction. The above is an example of a complete process of the speech interaction.

Figure 4:
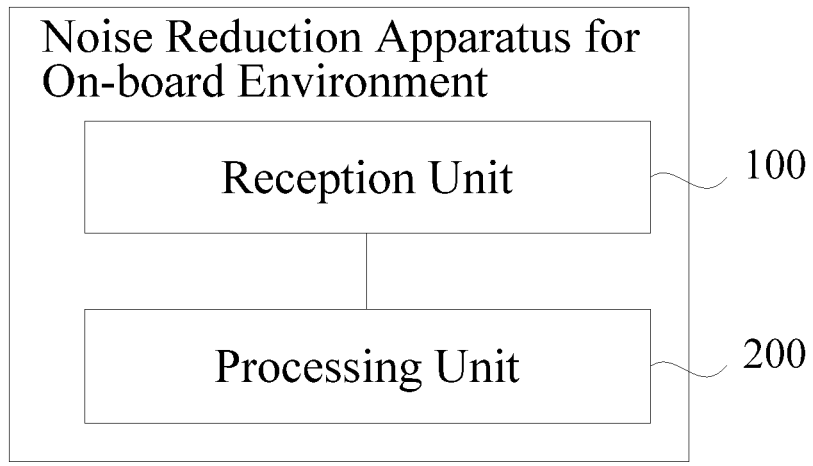
FIG. 4 is a schematic diagram of a noise reduction apparatus for an on-board environment according to an embodiment of the present application.

FIG. 4 is a schematic diagram of a noise reduction apparatus for an on-board environment according to an embodiment of the present application. As shown in FIG. 4, the noise reduction apparatus for the on-board environment according to the embodiment of the present application comprises:

a reception unit 100 configured to receive an interference signal in the on-board environment and receive a sound signal in the on-board environment, the interference signal comprising a vibration signal of a vehicle; and a processing unit 200 configured to perform noise reduction processing on the sound signal in the on-board environment to obtain a noise-reduced signal; wherein, the noise reduction processing comprises cancelling the interference signal from the sound signal in the on-board environment.

In one implementation, the reception unit 100 is configured to receive the sound signal in the on-board environment collected by an acoustic sensor unit provided on an acoustic sensor array.

In one implementation, the reception unit 100 is configured to receive the vibration signal of the vehicle collected by a vibration sensor provided on an acoustic sensor array.

In one implementation, the vibration sensor is provided at a central position of the acoustic sensor array.

In one implementation, the interference signal further comprises a sound signal played by an on-board device.

In one implementation, the interference signal further comprises an environmental noise signal;

the reception unit 100 is further configured to receive the environmental noise signal collected by an acoustic sensor provided in the on-board environment.

Figure 5:
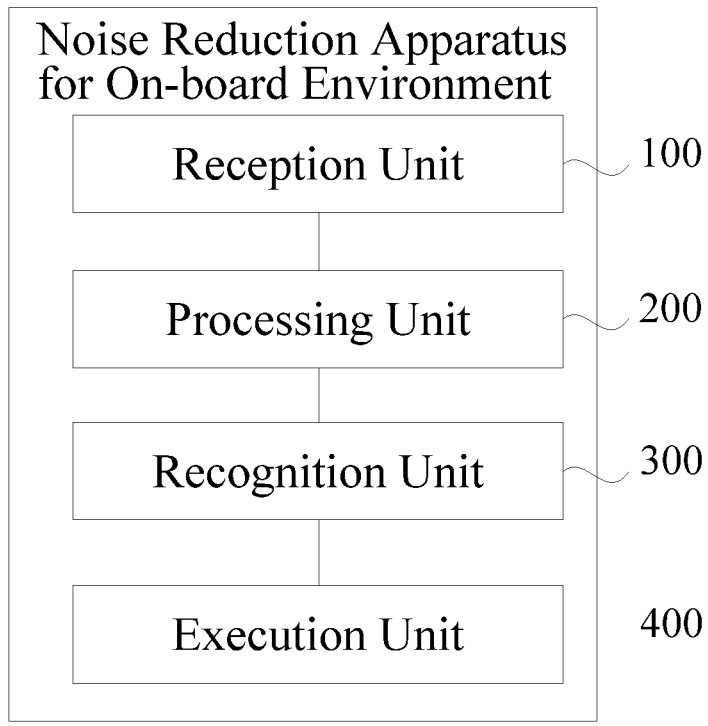
FIG. 5 is a schematic diagram of a noise reduction apparatus for an on-board environment according to another embodiment of the present application.

FIG. 5 is a schematic diagram of a noise reduction apparatus for an on-board environment according to another embodiment of the present application. As shown in FIG. 5, in one implementation, the above apparatus further comprises a recognition unit 300 configured to:

extract a speech feature sequence from the noise-reduced signal; and perform a speech recognition on the sound signal in the on-board environment based on the speech feature sequence.

In one implementation, the above apparatus further comprises an execution unit 400 configured to:

extract a speech feature sequence from the noise-reduced signal;

acquire an operation instruction corresponding to the speech feature sequence; and execute the operation instruction.

The function of each unit in each of the apparatuses according to embodiments of the present application may refer to corresponding descriptions in the above method, which will not be repeated here.

According to embodiments of the present application, an electronic device and a readable storage medium are also provided herein.

Figure 6:
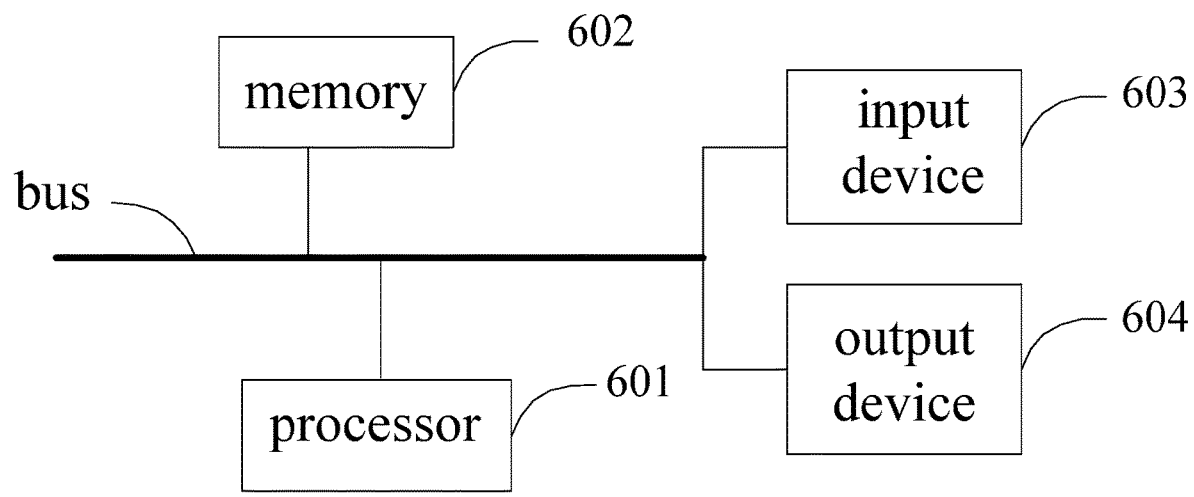
FIG. 6 is a block diagram of an electronic device for implementing a noise reduction method for an on-board environment according to an embodiment of the present application.

As shown in FIG. 6, it is a block diagram of an electronic device for the noise reduction method for on-board environment according to an embodiment of the present application. The electronic device is intended to represent various forms of digital computers, such as laptop computers, desktop computers, workbenches, personal digital assistants, servers, blade servers, mainframe computers, and other suitable computers. The electronic device may also represent various forms of mobile devices, such as personal digital assistants, cellular phones, smart phones, wearable devices, and other similar computing devices. The components shown herein, their connections and relationships, and their functions are merely examples, and are not intended to limit the implementation of the present application described and/or claimed herein.

As shown in FIG. 6, the electronic device includes: one or more processors 601, a memory 602, and interfaces for connecting various components which include a high-speed interface and a low-speed interface. The various components are connected to each other using different buses and may be installed on a common motherboard or installed in other ways as needed. The processor may process instructions executed within the electronic device, including instructions which are stored in the memory or on the memory to display graphic information of a Graphical user interface (GUI) on an external input/output device (such as a display apparatus coupled to the interface). In other embodiments, multiple processors and/or multiple buses may be used with multiple memories if desired. Similarly, multiple electronic devices may be connected, and each device provides a part of necessary operations (for example, as a server array, a group of blade servers, or a multi-processor system). In FIG. 6, one processor 601 is taken as an example.

The memory 602 may be a non-transitory computer readable storage medium provided by the present application. Here, the memory stores instructions executable by at least one processor, so that the at least one processor performs the method for monitoring an image acquisition device provided by the present application. The non-transitory computer readable storage medium of the present application stores computer instructions, which are used to cause the computer to perform the noise reduction method for on-board environment provided by the present application.

The memory 602, as a non-transitory computer readable storage medium, may be used to store non-transitory software programs, non-transitory computer executable programs and modules, such as program instructions/modules (for example, the reception unit 100 and the processing unit 200 as shown in FIG. 4, and the recognition unit 300 and the execution unit 400 as shown in FIG. 5) corresponding to the noise reduction method for on-board environment in embodiments of the present application. The processor 601 executes various functional applications and data processing of the server by executing the non-transitory software programs, instructions, and modules stored in the memory 602, that is, implements the noise reduction method for on-board environment in foregoing method embodiments.

The memory 602 may include a storage program area and a storage data area, where the storage program area may store an operating system and application programs required by at least one function, and the storage data area may store the data created based on the use of the electronic device for implementing the noise reduction method for on-board environment, and the like. In addition, the memory 602 may include a high-speed random-access memory, and may also include a non-transitory memory, such as at least one magnetic disk storage device, a flash memory device, or other non-transitory solid-state storage devices. In some embodiments, the memory 602 may optionally include memories set remotely relative to the processor 601, and these remote memories may be connected to the electronic device for implementing the noise reduction method for on-board environment through a network. Instances of the above network include but are not limited to the Internet, an intranet, a local area network, a mobile communication network, and combinations thereof.

The electronic device for implementing the noise reduction method for on-board environment may further comprise: an input device 603 and an output device 604. The processor 601, the memory 602, the input device 603, and the output device 604 may be connected through a bus or in other ways. In FIG. 7, the connection through a bus is taken as an example.

The input device 603, such as a touch screen, a keypad, a mouse, a trackpad, a touchpad, an indication rod, one or more mouse buttons, a trackball, a joystick, etc., may receive input numeric or character information, and generate key signal inputs related to user settings and function control of the electronic device for implementing the noise reduction method for on-board environment. The output device 604 may include a display apparatus, an auxiliary lighting device (for example, LED), a tactile feedback device (for example, a vibration motor), and the like. The display apparatus may include, but is not limited to, a liquid crystal display (LCD), a light emitting diode (LED) display, and a plasma display. In some embodiments, the display apparatus may be a touch screen.

Various embodiments of the systems and techniques described herein may be implemented in digital electronic circuit systems, integrated circuit systems, application specific integrated circuits (ASICs), computer hardware, firmware, software, and/or combination thereof. These various embodiments may include: implementations in one or more computer programs which may be executed and/or interpreted on a programmable system that includes at least one programmable processor, which may be a dedicated or general-purpose programmable processor that may receive data and instructions from a storage system, at least one input device, and at least one output device, and transmit the data and instructions to the storage system, the at least one input device, and the at least one output device.

These computer programs (also called as programs, software, software applications, or codes) include machine instructions of programmable processors, and these computer programs may be implemented using a high-level process and/or object-oriented programming language, and/or an assembly/machine language. As used herein, the terms "machine readable medium" and "computer readable medium" refer to any computer program product, apparatus, and/or device (for example, a magnetic disk, an optical disk, a memory, a programmable logic device (PLD)) used to provide machine instructions and/or data to a programmable processor, including the machine-readable medium that receives machine instructions as machine readable signals. The term "machine readable signal" refers to any signal used to provide machine instructions and/or data to the programmable processor.

In order to provide interactions with a user, the system and technology described herein may be implemented on a computer which has: a display device (for example, CRT (Cathode Ray Tube) or LCD (liquid crystal display) monitor) for displaying information to the user; and a keyboard and pointing device (for example, a mouse or a trackball) through which the user may provide input to the computer. Other kinds of devices may also be used to provide interactions with a user; for example, the feedback provided to a user may be any form of sensory feedback (for example, visual feedback, auditory feedback, or tactile feedback); and input from a user may be received using any form (including acoustic input, audio signal input, or tactile input).

The systems and techniques described herein may be implemented in a computing system (for example, as a data server) that includes back-end components, or a computing system (for example, an application server) that includes middleware components, or a computing system (for example, a user computer with a graphical user interface or a web browser through which the user may interact with the implementation of the systems and technologies described herein) that includes front-end components, or a computing system that includes any combination of such back-end components, intermediate components, or front-end components. The components of the system may be interconnected by any form or medium of digital data communication (for example, a communication network). Examples of communication networks include: a Local Area Network (LAN), a Wide Area Network (WAN), and the Internet.

The computer system may include a client and a server. The client and the server are generally remote from each other and typically interact through a communication network. The client-server relationship is generated by computer programs that run on respective computers and have a client-server relationship with each other.

According to the embodiments of the present application, the vibration signal of the vehicle may be canceled from the sound signal in the on-board environment, so as to improve the noise reduction capability of the acoustic echo cancellation in a speech recognition system and increase the signal to noise ratio of effective signals, thereby effectively improving the speech recognition and wake-up capability of the system.

It should be understood that various forms of processes shown above may be used to reorder, add, or delete steps. For example, respective steps described in the present application may be executed in parallel, or may be executed sequentially, or may be executed in a different order, as long as the desired result of the technical solution disclosed in the present application can be achieved, no limitation is made herein.

The above specific embodiments do not constitute a limitation on the protection scope of the present application. It should be understood by those skilled in the art that various modifications, combinations, sub-combinations, and substitutions may be made according to design requirements and other factors. Any modification, equivalent replacement and improvement, and the like made within the spirit and principle of the present application shall be fall in the protection scope of the present application.

What is claimed is:

1. A noise reduction method for an on-board environment, comprising:
   receiving an interference signal in the on-board environment and receiving a sound signal in the on-board environment, the interference signal comprising a vibration signal of a vehicle, a sound signal played by an on-board device, and an environmental noise signal; and
   performing noise reduction processing on the sound signal in the on-board environment to obtain a noise-reduced signal; wherein, the noise reduction processing comprises cancelling the interference signal from the sound signal in the on-board environment,
   wherein the receiving the interference signal in the on-board environment comprises:
   receiving the vibration signal of the vehicle collected by a vibration sensor provided on an acoustic sensor array,
   receiving the sound signal played by the on-board device which is acquired from the on-board device playing the sound signal, and
   receiving the environmental noise signal collected by an acoustic sensor provided in the on-board environment.

2. The method according to claim 1, wherein the receiving the sound signal in the on-board environment comprises: receiving the sound signal in the on-board environment collected by an acoustic sensor unit provided on the acoustic sensor array.

3. The method according to claim 1, wherein the vibration sensor is provided at a central position of the acoustic sensor array.

4. The method according to claim 1, further comprising:
   extracting a speech feature sequence from the noise-reduced signal; and
   performing a speech recognition on the sound signal in the on-board environment based on the speech feature sequence.

5. The method according to of claim 1, further comprising:
   extracting a speech feature sequence from the noise-reduced signal;
   acquiring an operation instruction corresponding to the speech feature sequence; and
   executing the operation instruction.

6. A noise reduction apparatus for an on-board environment, comprising:
   a processor and a memory for storing one or more computer programs executable by the processor,
   wherein when executing at least one of the computer programs, the processor is configured to perform operations comprising:
   receiving an interference signal in the on-board environment and receiving a sound signal in the on-board environment, the interference signal comprising a vibration signal of a vehicle, a sound signal played by an on-board device, and an environmental noise signal; and
   performing noise reduction processing on the sound signal in the on-board environment to obtain a noise-reduced signal; wherein, the noise reduction processing comprises cancelling the interference signal from the sound signal in the on-board environment,
   wherein the receiving the interference signal in the on-board environment comprises:
   receiving the vibration signal of the vehicle collected by a vibration sensor provided on an acoustic sensor array,
   receiving the sound signal played by the on-board device which is acquired from the on-board device playing the sound signal, and
   receiving the environmental noise signal collected by an acoustic sensor provided in the on-board environment.

7. The apparatus according to claim 6, wherein the receiving the sound signal in the on-board environment comprises: receiving the sound signal in the on-board environment collected by an acoustic sensor unit provided on the acoustic sensor array.

8. The apparatus according to claim 6, wherein the vibration sensor is provided at a central position of the acoustic sensor array.

9. The apparatus according to claim 6, wherein when executing at least one of the computer programs, the processor is further configured to perform operations comprising:
   extracting a speech feature sequence from the noise-reduced signal; and
   performing a speech recognition on the sound signal in the on-board environment based on the speech feature sequence.

10. The apparatus according to claim 6, wherein when executing at least one of the computer programs, the processor is further configured to perform operations comprising:
    extracting a speech feature sequence from the noise-reduced signal;
    acquiring an operation instruction corresponding to the speech feature sequence; and
    extracting the operation instruction.

11. A non-transitory computer-readable storage medium having computer instructions stored therein, wherein the computer instructions, when executed by a computer, cause the computer to perform operations comprising:
    receiving an interference signal in the on-board environment and receiving a sound signal in the on-board environment, the interference signal comprising a vibration signal of a vehicle, a sound signal played by an on-board device, and an environmental noise signal; and
    performing noise reduction processing on the sound signal in the on-board environment to obtain a noise-reduced signal; wherein, the noise reduction processing comprises cancelling the interference signal from the sound signal in the on-board environment, wherein the receiving the interference signal in the on-board environment comprises:

receiving the vibration signal of the vehicle collected by a vibration sensor provided on an acoustic sensor array, receiving the sound signal played by the on-board device which is acquired from the on-board device playing the sound signal, and receiving the environmental noise signal collected by an acoustic sensor provided in the on-board environment.

12. The non-transitory computer-readable storage medium according to claim 11, wherein the vibration sensor is provided at a central position of the acoustic sensor array.

\* \* \* \* \*